United States Patent
Usui et al.

(10) Patent No.: US 12,038,349 B2
(45) Date of Patent: Jul. 16, 2024

(54) INSPECTION SYSTEM, INSPECTION APPARATUS, AND INSPECTION METHOD

(71) Applicant: Kabushiki Kaisha Toshiba, Tokyo (JP)

(72) Inventors: Takashi Usui, Saitama Saitama (JP); Toshiki Takayasu, Kawasaki Kanagawa (JP); Kazuo Watabe, Yokohama Kanagawa (JP); Atsuro Oonishi, Kawasaki Kanagawa (JP); Hiroshi Takahashi, Yokohama Kanagawa (JP); Takamitsu Sunaoshi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 17/463,035

(22) Filed: Aug. 31, 2021

(65) Prior Publication Data
US 2022/0299406 A1    Sep. 22, 2022

(30) Foreign Application Priority Data
Mar. 22, 2021 (JP) .................. 2021-046769

(51) Int. Cl.
G01M 17/10 (2006.01)
(52) U.S. Cl.
CPC .................. G01M 17/10 (2013.01)
(58) Field of Classification Search
CPC .................................................. G01M 17/10
See application file for complete search history.

(56) References Cited

U.S. PATENT DOCUMENTS

2006/0266122 A1* 11/2006 Pagano ............... G01N 29/275
                                                                    73/606
2010/0116041 A1*  5/2010 Wach .................... B61K 9/04
                                                                    73/117.01
(Continued)

FOREIGN PATENT DOCUMENTS

JP      2010-527828 A    8/2010
JP      2018-75954 A     5/2018
(Continued)

OTHER PUBLICATIONS

Yasufumi Suzuki et al., "Vibration Analysis on Truck Frame of Railway Vehicle Considering its Flexural Rigidity," Proc. of the Japan Soc. of Mechanical Engineers, vol. 63, No. 611, pp. 2221-2228 (1997).

*Primary Examiner* — Jamel E Williams
(74) *Attorney, Agent, or Firm* — Finnegan, Henderson, Farabow, Garrett & Dunner, LLP

(57) ABSTRACT

According to one embodiment, an inspection system of an embodiment is an inspection system for inspecting a bogie including a plurality of side beams extending in a front-rear direction and disposed apart from each other in a left-right direction and a cross beam connecting the plurality of side beams. The inspection system includes one or more sensors and a position locator. The one or more sensors are installed on at least one of the plurality of side beams and the cross beam and detect elastic waves. The position locator identifies a beam in which the elastic waves have been generated or locates a position of an elastic wave source on the basis of the elastic waves detected by the one or more sensors.

14 Claims, 10 Drawing Sheets

(56) References Cited

U.S. PATENT DOCUMENTS

| | | | | |
|---|---|---|---|---|
| 2017/0336364 A1* | 11/2017 | Watabe | ................ | G01N 29/043 |
| 2018/0074019 A1* | 3/2018 | Iida | ........................ | G01N 29/07 |
| 2019/0317051 A1* | 10/2019 | Watabe | .............. | G01N 29/4463 |
| 2021/0181011 A1* | 6/2021 | Watabe | ................ | G01G 19/042 |
| 2022/0334082 A1* | 10/2022 | Takayasu | .............. | B61L 23/045 |

FOREIGN PATENT DOCUMENTS

| | | |
|---|---|---|
| JP | 2019-130982 A | 8/2019 |
| JP | 2020-163883 A | 10/2020 |
| JP | 2021-96122 A | 6/2021 |
| WO | WO 2008/141774 A1 | 11/2008 |
| WO | WO 2019/081770 A1 | 5/2019 |

* cited by examiner (A)

(B)

INSPECTION SYSTEM, INSPECTION APPARATUS, AND INSPECTION METHOD

CROSS-REFERENCE TO RELATED APPLICATION

This application is based upon and claims the benefit of priority from Japanese Patent Application No. 2021-046769, filed Mar. 22, 2021, the entire contents of which are incorporated herein by reference.

FIELD

Embodiments described herein relate generally to an inspection system, an inspection apparatus, and an inspection method.

BACKGROUND

In recent years, expectations for railway transportation have increased from the viewpoint of an environmental load. On the other hand, damage to a bogie of a railway vehicle is likely to lead to a serious accident and a system for monitoring the soundness of a bogie itself has become important. However, in the conventional method, inspection may be time-consuming or it is possible to detect damage only after the damage becomes extensive. If an abnormality can be detected at an initial stage of damage, more effective countermeasures can be expected, which is desirable from the viewpoint of preventing serious accidents. Also, the above-described problems similarly occur in other bogies as well as a bogie of a railway vehicle.

DETAILED DESCRIPTION OF THE INVENTION

The present invention provides a problem to be solved by the present invention is to provide an inspection system, an inspection apparatus, and an inspection method capable of easily identifying an abnormality in a bogie before damage becomes extensive.

According to one embodiment, an inspection system of an embodiment is an inspection system for inspecting a bogie including a plurality of side beams extending in a front-rear direction and disposed apart from each other in a left-right direction and a cross beam connecting the plurality of side beams. The inspection system includes one or more sensors and a position locator. The one or more sensors are installed on at least one of the plurality of side beams and the cross beam and detect elastic waves. The position locator identifies a beam in which the elastic waves have been generated or locates a position of an elastic wave source on the basis of the elastic waves detected by the one or more sensors.

Hereinafter, an inspection system, an inspection apparatus, and an inspection method according to embodiments will be described with reference to the drawings.

(Overview)

The inspection system according to the embodiment is a system for inspecting a bogie of a railway vehicle. The inspection of the bogie of a railway vehicle involves identifying a position where damage to the bogie or an abnormality such as damage is estimated to occur and identifying the presence or absence of damage. In the inspection system according to the embodiment, elastic waves generated in the bogie are used for inspecting the bogie of the railway vehicle. In a railway bogie, when a load is applied to the bogie, elastic waves are generated mainly from minute defects occurring in a welded portion between structural members. Therefore, in the inspection system according to the embodiment, one or more sensors installed on the bogie detect elastic waves generated when a load is applied to the bogie and perform at least a process of identifying a beam that is a source of the elastic waves (hereinafter referred to as an elastic wave source) or locating a position of the elastic wave source on the basis of the detected elastic waves. Here, the beam that is the elastic wave source is a beam in which elastic waves are generated, and is at least one of side beams and a cross beam.

Figure 1:
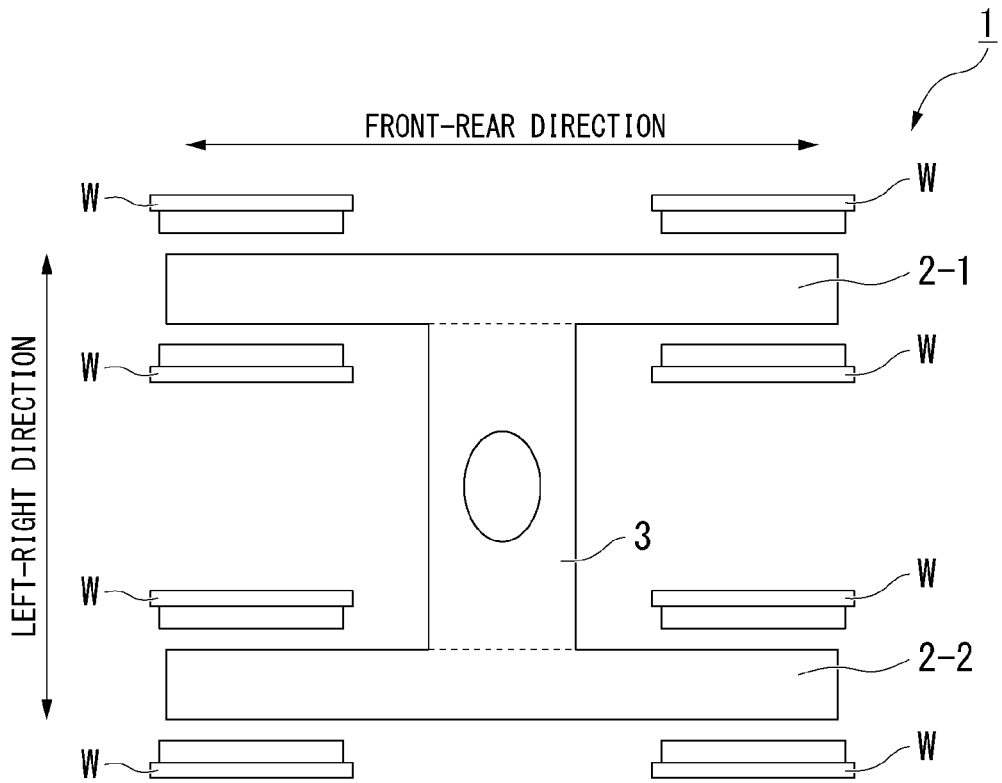
FIG. 1 is a diagram showing an example of a bogie according to an embodiment.

As shown in FIG. 1, a bogie 1 of the railway vehicle generally includes a pair of two side beams 2-1 and 2-2 extending in a front-rear direction of the railway vehicle and disposed apart from each other in a left-right direction of the railway vehicle, a cross beam 3 connecting the two side beams 2-1 and 2-2, and a plurality of wheels W (see Reference Documents 1 to 3). Also, in the following description, when the side beams 2-1 to 2-2 are not particularly distinguished, they will be described as side beams 2. The front-rear direction of the railway vehicle is a longitudinal direction of the railway vehicle. The left-right direction of the railway vehicle is a direction perpendicular to the longitudinal direction of the railway vehicle. An electric motor, forged parts, and the like are connected to a portion of each of the side beams 2-1 to 2-2 and the cross beam 3 through welding.

(Reference Document 1: Japanese Unexamined Patent Application, First Publication No. 2020-163883)

(Reference Document 2: Japanese Unexamined Patent Application, First Publication No. 2019-130982)

(Reference Document 3: Japanese Unexamined Patent Application, First Publication No. 2018-75954)

Figure 2:
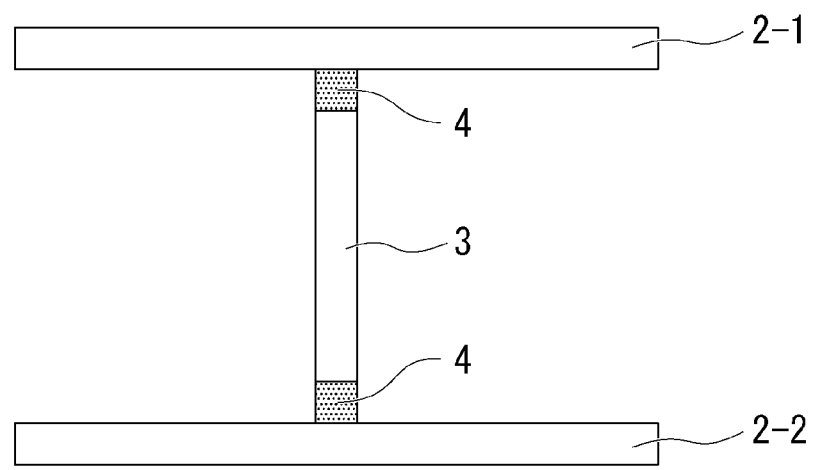
FIG. 2 is a diagram showing an example of an elastic wave propagation model according to the embodiment.

In performing the inspection by the inspection system according to the embodiment, the simplification of the bogie 1 of the railway vehicle having a three-dimensionally complicated structure for the purpose of identifying the beam of the elastic wave source or locating the position of the elastic wave source is taken into account. A connector between the side beam 2 and the cross beam 3 is connected through welding. Thus, at a welded portion which is the connector between the side beam 2 and the cross beam 3, reflection or the like is generated due to the discontinuity of a shape and a signal is attenuated. For example, the signal is attenuated by about 20 dB at the welded portion. In the following description, it is assumed that the signal is attenuated by 20 dB at the welded portion. In this regard, the bogie 1 is simplified as shown in FIG. 2. Hereinafter, a model shown in FIG. 2 will be described as an elastic wave propagation model. FIG. 2 is a diagram showing an example of an elastic wave propagation model according to the embodiment.

As shown in FIG. 2, the side beam 2 is simplified to a one-dimensional element extending in the front-rear direction of the bogie 1 and the cross beam 3 is simplified to a one-dimensional element extending in the left-right direction of the bogie 1. The two side beams 2-1 and 2-2 are connected by the cross beam 3 near the center. Furthermore, a welded portion 4 to which a signal attenuation of 20 dB is applied is provided at a contact point between the side beam 2 and the cross beam 3, so that more accurate analysis becomes possible. As a result, the bogie 1 shown in FIG. 1 can be simplified to an "H"-shaped structure. In the inspection system according to the embodiment, the bogie 1 is inspected in consideration of an elastic wave propagation model to which the bogie 1 having a complicated shape is simplified.

A specific configuration of the inspection system will be described below.

First Embodiment

Figure 3:
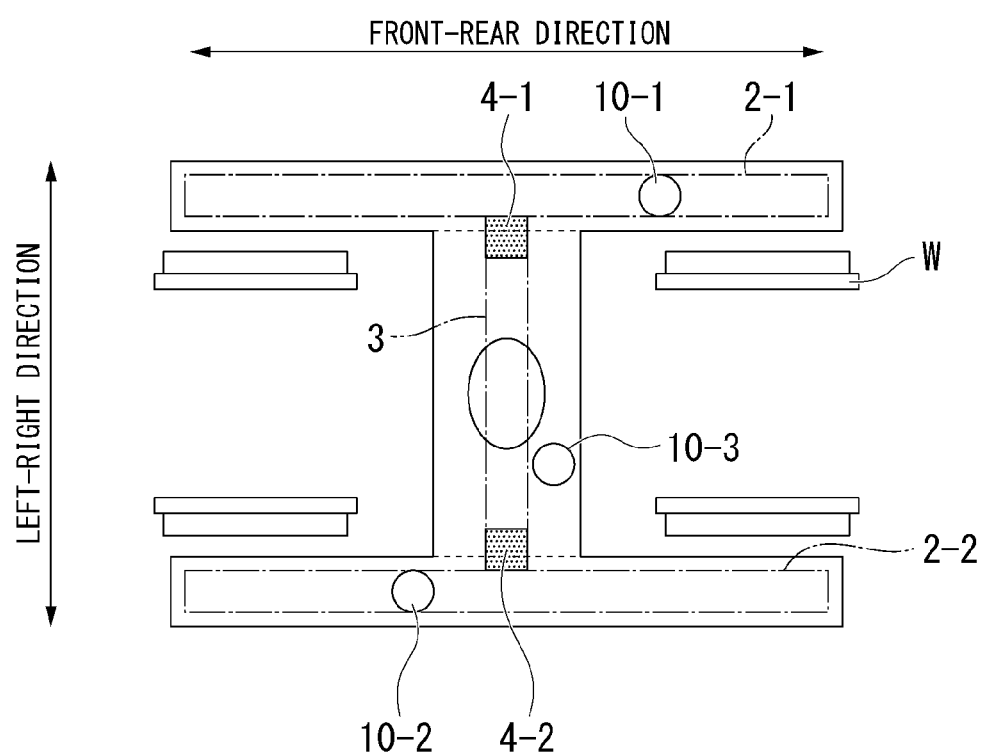
FIG. 3 is a diagram showing an example of an arrangement of sensors according to a first embodiment.

FIG. 3 is a diagram showing an example of an arrangement of the sensors 10 according to the first embodiment.

As shown in FIG. 3, in the first embodiment, it is assumed that one sensor 10 is installed for each of the side beams 2-1 and 2-2 and the cross beam 3. It is assumed that the sensor 10 installed on the side beam 2-1 is a sensor 10-1, the sensor 10 installed on the side beam 2-2 is a sensor 10-2, and the sensor 10 installed on the cross beam 3 is a sensor 10-3. Also, installation positions of the sensors 10-1, 10-2, and 10-3 are not limited to the locations shown in FIG. 3 and may be any positions as long as they are on the beams on which the sensors 10-1, 10-2, and 10-3 are installed. Also, it is assumed that the welded portion between the side beam 2-1 and the cross beam 3 is a welded portion 4-1 and the welded portion between the side beam 2-2 and the cross beam 3 is a welded portion 4-2.

Figure 4:
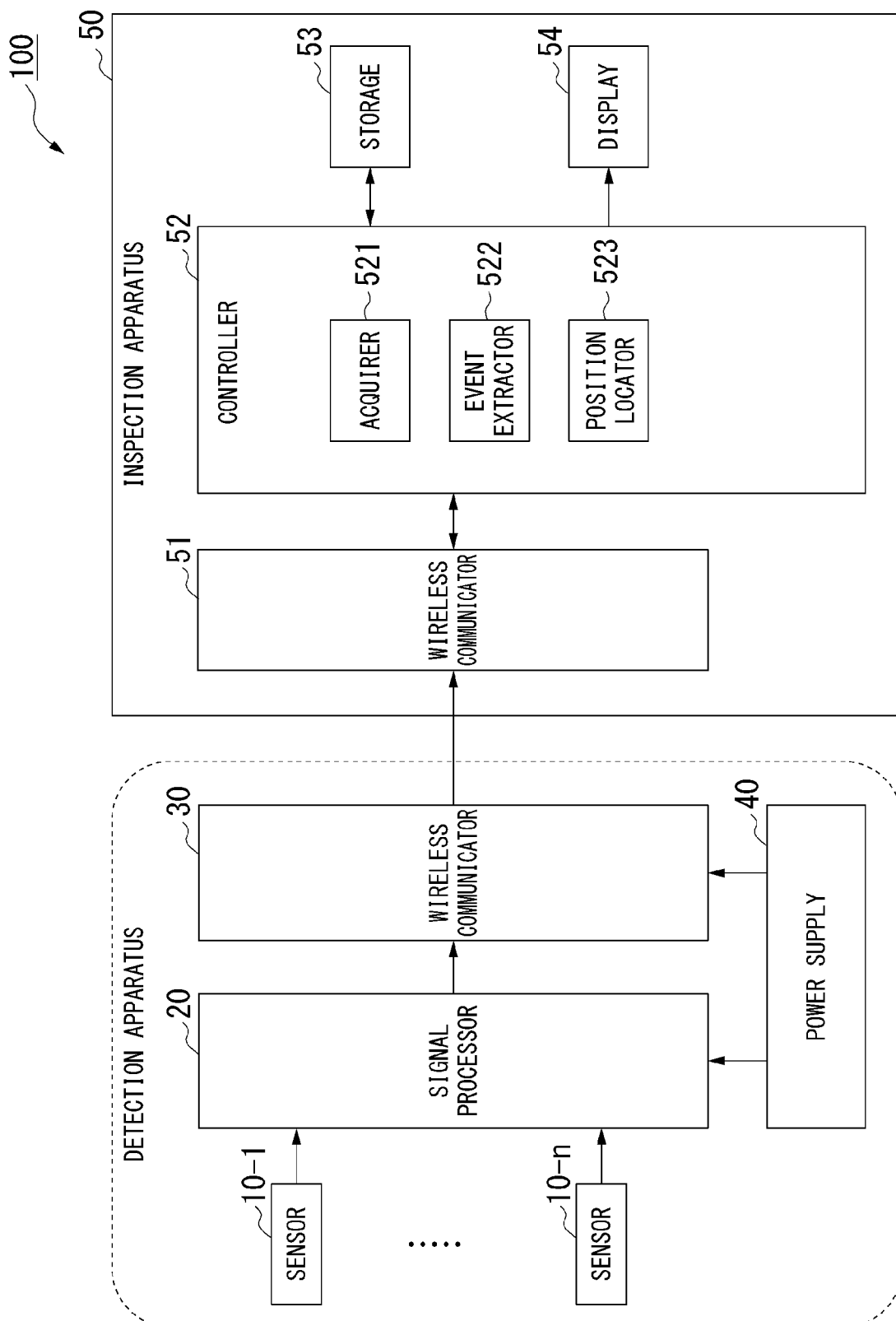
FIG. 4 is a diagram showing a configuration of an inspection system according to the first embodiment.

FIG. 4 is a diagram showing a configuration of an inspection system 100 according to the first embodiment. The inspection system 100 includes a plurality of sensors 10-1 to 10-*n* (n is an integer of 2 or more), a signal processor 20, a wireless communicator 30, a power supply 40, and an inspection apparatus 50. The sensors 10-1 to 10-*n* and the signal processor 20 are connected so that they can perform wired communication. In the first embodiment, the sensors 10-1 to 10-*n*, the signal processor 20, the wireless communicator 30, and the power supply 40 are configured as a detection apparatus for detecting elastic waves that have been generated in the bogie 1. Also, in the following description, the sensors 10-1 to 10-*n* will be described as sensors 10 when they are not particularly distinguished.

The sensors 10 are installed on the bogie 1. The signal processor 20, the wireless communicator 30, and the power supply 40 may be installed on the bogie 1, may be mounted on the railway vehicle, or may be mounted on the wheels W.

The inspection apparatus 50 may be provided in the same place as the detection apparatus or may be provided in a place different from the place where the detection apparatus is installed (for example, a management office where there is an administrator of the inspection system 100 or the like).

The sensor 10 detects elastic waves that have been generated in the bogie 1. More specifically, the sensor 10 detects elastic waves that have been generated in at least one of the side beams 2 and the cross beam 3 constituting the bogie 1. The sensor 10 converts the detected elastic waves into an electrical signal.

For the sensor 10, for example, a piezoelectric element having sensitivity in a range of 10 kHz to 1 MHz is used. A more suitable sensor 10 is a piezoelectric element having a sensitivity of 100 kHz to 200 kHz. Types of the sensor 10 include a resonance type having a resonance peak within a frequency range, a broadband type in which resonance is limited, and the like, but the sensor 10 may be of any type. Methods of the sensor 10 detecting elastic waves include a voltage output type, a resistance change type, a capacitance type, and the like, but any detection method may be used. An amplifier may be embedded in the sensor 10.

An acceleration sensor may be used instead of the sensor 10. In this case, the acceleration sensor detects elastic waves that have been generated in the bogie 1. The acceleration sensor converts the detected elastic waves into an electrical signal by performing a process similar to that of the sensor 10.

The signal processor 20 inputs the electrical signal output from the sensor 10. The signal processor 20 performs signal processing on the input electrical signal. The signal processing performed by the signal processor 20 is, for example, noise removal, arrival time determination, parameter extraction, and the like. The signal processor 20 outputs data of a feature value of the elastic waves obtained through the signal processing as transmission data to the wireless communicator 30.

The signal processor 20 is configured using an analog circuit or a digital circuit. The digital circuit is implemented by, for example, a field programmable gate array (FPGA) and a microprocessor. By using a non-volatile FPGA, power consumption during standby can be limited. The digital circuit may be implemented by a dedicated large-scale integration (LSI) circuit. The signal processor 20 may be equipped with a non-volatile memory such as a flash memory or a removable memory.

The wireless communicator 30 transmits the transmission data output from the signal processor 20 to the inspection apparatus 50 at a prescribed timing.

The power supply 40 supplies electric power to the signal processor 20 and the wireless communicator 30. It is preferable that the power supply 40 be an independent power supply. The power supply 40 is a device that uses an energy harvester represented by, for example, a primary battery, charging of a secondary battery with a return current, or a vibration power generator.

Also, it is more preferable to use a vibration power generator as the power supply 40. The vibration power generator is installed at a prescribed position on the bogie and generates electric power using vertical vibrations of the bogie. Thereby, battery replacement is unnecessary, wiring can be completed on the bogie, and installation costs can be reduced. A larger amount of power generation can be obtained by adopting a configuration in which a natural frequency of a movable element in the vibration power generator is included in a range of a natural frequency of an installed bogie frame±10%. In particular, it is desirable that the natural frequency of the movable element in the vibration power generator be set near a primary bending natural frequency of the bogie frame. The primary bending natural frequency of the bogie frame corresponds to the vicinity of a second dominant frequency in a spectrum of bogie acceleration when counted from the low frequency side. For example, it is known that the primary bending natural frequency of the bogie frame is around 40 Hz (see, for example, Non-Patent Document 1). It is desirable that the prescribed position be near a center or either end of the side beam 2. The vicinity of the center of the side beam 2 includes the vicinity of the air spring that supports the railway vehicle and the vicinity of either end of the side beam 2 includes the vicinity of a position directly above the axle box.

The inspection apparatus 50 inspects the bogie 1 using transmission data for a prescribed period transmitted from the wireless communicator 30. In the inspection apparatus 50 according to the first embodiment, the beam in which the elastic waves have been generated is identified using the transmission data for a prescribed period transmitted from the wireless communicator 30.

Figure 5:
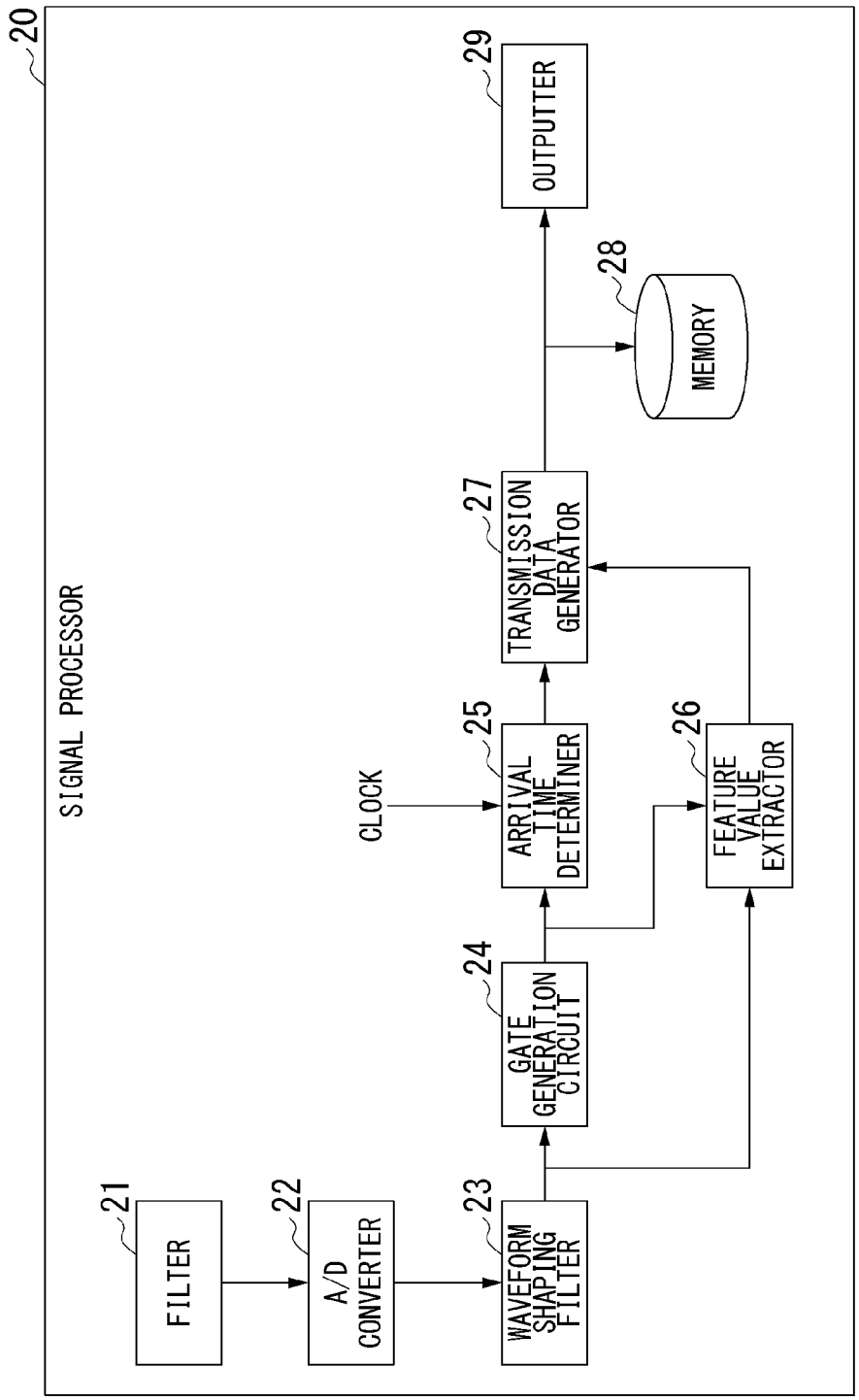
FIG. 5 is a schematic block diagram showing functions of a signal processor according to the first embodiment.

FIG. 5 is a schematic block diagram showing functions of the signal processor 20 according to the first embodiment. The signal processor 20 includes a filter 21, an analog-to-digital (A/D) converter 22, a waveform shaping filter 23, a gate generation circuit 24, an arrival time determiner 25, a feature value extractor 26, a transmission data generator 27, a memory 28, and an outputter 29.

The filter 21 removes a noise component other than a signal band in an electrical signal output from the sensor 10. The filter 21 is, for example, a band pass filter (BPF).

The A/D converter 22 quantizes the electrical signal from which the noise component has been removed and converts the quantized electrical signal into a digital signal. The A/D converter 22 outputs the digital signal to the waveform shaping filter 23.

The waveform shaping filter 23 removes a noise component outside a prescribed signal band from the input digital signal of time-series data. The waveform shaping filter 23 is, for example, a band pass filter (BPF). For example, it is assumed that the waveform shaping filter 23 is set to pass the same frequency band as the filter 21. The waveform shaping filter 23 outputs a signal after removal of the noise component (hereinafter referred to as a "noise-removed signal") to the gate generation circuit 24 and the feature value extractor 26.

The gate generation circuit 24 inputs the noise-removed signal output from the waveform shaping filter 23. The gate generation circuit 24 generates a gate signal on the basis of the input noise-removed signal. The gate signal is a signal indicating whether or not a waveform of the noise-removed signal is sustained.

The gate generation circuit 24 is implemented by, for example, an envelope detector and a comparator. The envelope detector detects an envelope of the noise-removed signal. The envelope is extracted, for example, by squaring the noise-removed signal and performing a prescribed process (for example, a process using a low-pass filter or a Hilbert transform) on an output value after the noise-removed signal is squared. The comparator determines whether or not the envelope of the noise-removed signal is greater than or equal to a prescribed threshold value.

When the envelope of the noise-removed signal becomes greater than or equal to the prescribed threshold value, the gate generation circuit 24 outputs a first gate signal indicating that the waveform of the noise-removed signal is sustained to the arrival time determiner 25 and the feature value extractor 26. On the other hand, when the envelope of the noise-removed signal becomes less than the prescribed threshold value, the gate generation circuit 24 outputs a second gate signal indicating that the waveform of the noise-removed signal is not sustained to the arrival time determiner 25 and the feature value extractor 26.

The arrival time determiner 25 inputs a clock output from a clock source such as a crystal oscillator (not shown) and the gate signal output from the gate generation circuit 24. The arrival time determiner 25 determines an elastic wave arrival time using the clock input while the first gate signal is being input. The arrival time determiner 25 outputs the determined elastic wave arrival time as time information to the transmission data generator 27. The arrival time determiner 25 does not perform a process while the second gate signal is being input. The arrival time determiner 25 generates cumulative time information from the time when electric power is turned on on the basis of a signal from the clock source. Specifically, it is only necessary for the arrival time determiner 25 to be a counter that counts an edge of the clock and to use a value of a register of the counter as time information. The register of the counter is determined to have a prescribed bit length.

The feature value extractor 26 inputs the noise-removed signal output from the waveform shaping filter 23 and the gate signal output from the gate generation circuit 24. The feature value extractor 26 extracts a feature value of the noise-removed signal using the noise-removed signal that has been input while the first gate signal is being input. The feature value extractor 26 does not perform a process while the second gate signal is being input. The feature value is information indicating a feature of the noise-removed signal.

Feature quantities are, for example, an amplitude [mV] of the waveform, a rising time period [μsec] of the waveform, the duration [μsec] of the gate signal, a zero cross count [times], and the energy [arb.] of the waveform, a frequency [Hz], a root mean square (RMS) value, and the like. The feature value extractor 26 outputs a parameter related to an extracted feature value to the transmission data generator 27. When the feature value extractor 26 outputs the parameter related to the feature value, a sensor ID is associated with the parameter related to the feature value. The sensor ID represents identification information for identifying the sensor 10 installed on the bogie 1. Thereby, it is possible to identify a sensor 10 that has detected the feature value of the elastic waves as the parameter related to the feature value.

The amplitude of the waveform is, for example, a value of a maximum amplitude in the noise-removed signal. The rising time period of the waveform is, for example, a time period T1 until the noise-removed signal reaches the maximum value from the start of rising of the gate signal. The duration of the gate signal is, for example, a time period until the amplitude becomes less than a preset value from the start of rising of the gate signal. The zero cross count is, for example, the number of times the noise-removed signal crosses a reference line passing through a zero value.

The energy of the waveform is, for example, a value obtained by performing time integration of the square of the amplitude of the noise-removed signal at each time point. The definition of the energy is not limited to the above example and the energy may be approximated using, for example, the envelope of the waveform. The frequency is a frequency of the noise-removed signal. The RMS value is, for example, a value obtained by squaring the amplitude of the noise-removed signal at each time point and taking a square root.

The transmission data generator 27 inputs the sensor ID, the time information, and the parameter related to the feature value. The transmission data generator 27 generates transmission data including the input sensor ID, the time information, and the parameter related to the feature value. The transmission data generator 27 may record the generated transmission data in the memory 28 or may output the generated transmission data to the outputter 29 without recording the generated transmission data in the memory 28.

The memory 28 stores the transmission data. The memory 28 is, for example, a dual port random access memory (RAM).

The outputter 29 sequentially outputs the transmission data stored in the memory 28 or the transmission data output from the transmission data generator 27 to the wireless communicator 30.

Description will be given with reference back to FIG. 4.

The inspection apparatus 50 includes a wireless communicator 51, a controller 52, a storage 53, and a display 54.

The wireless communicator 51 receives the transmission data transmitted from the wireless communicator 30. The wireless communicator 51 outputs the received transmission data to the controller 52.

The controller 52 controls the entire inspection apparatus 50. The controller 52 is configured using a processor such as a central processing unit (CPU) or a memory. The controller 52 functions as an acquirer 521, an event extractor 522, and a position locator 523 by executing the program.

Some or all functional units of the acquirer 521, the event extractor 522, and the position locator 523 may be implemented by hardware (including a circuit; circuitry) such as an application specific integrated circuit (ASIC), a programmable logic device (PLD), or an FPGA or may be implemented by software and hardware in cooperation. The program may be recorded on a computer-readable recording medium. The computer-readable recording medium is, for example, a non-transitory storage medium which is a flexible disk, a magneto-optical disk, a ROM, a portable medium such as a CD-ROM, a storage device such as a hard disk embedded in a computer system, or the like. The program may be transmitted via a telecommunication circuit.

Some of the functions of the acquirer 521, the event extractor 522, and the position locator 523 do not need to be installed in the inspection apparatus 50 in advance and may be implemented by installing an additional application program in the inspection apparatus 50.

The acquirer 521 acquires various types of information. For example, the acquirer 521 acquires the transmission data received by the wireless communicator 51. The acquirer 521 saves the acquired transmission data in the storage 53.

The event extractor 522 extracts transmission data of one event from the transmission data stored in the storage 53. The event represents an elastic wave generation event that has occurred in the bogie 1. The elastic wave generation event in the present embodiment is a load to the bogie 1. For example, in the railway vehicle, at least a load due to the weight of a vehicle body provided on the bogie 1 is applied to the bogie 1. When one event has occurred, elastic waves are detected by a plurality of sensors 10 at substantially the same time. That is, the storage 53 stores transmission data related to elastic waves detected at substantially the same time. Therefore, the event extractor 522 provides a prescribed time window, and extracts all transmission data whose arrival time is within a range of the time window as transmission data of one event. The event extractor 522 outputs the transmission data of the one event that has been extracted to the position locator 523. Hereinafter, a method of extracting transmission data of one event by providing the prescribed time window will be described as a first extraction method.

A range Tw of the time window may be determined to be in a range of Tw≥dmax/v using the elastic wave propagation velocity v in the bogie 1 serving as a target and a maximum sensor interval dmax. Because it is desirable to set Tw to a value as small as possible so that erroneous detection is avoided, Tw=dmax/v can be substantially set. The elastic wave propagation velocity v may be obtained in advance.

For the elastic wave propagation velocity v, a look-up table provided in advance may be used. The elastic wave propagation velocity v of propagation into the material can be expressed by the following Eq. (1) using a volume elastic modulus k (Pa) and a density $\rho_0$ (kg/m$^3$) of the material.

$$v = \sqrt{\frac{K}{\rho_0}} \tag{1}$$

Considering a three-dimensional body, the elastic wave propagation velocity v can be calculated on the basis of the following Eq. (2) in consideration of a shear modulus G.

$$v = \sqrt{\frac{1}{\rho_0} \cdot \left(K + \frac{4}{3}G\right)} \tag{2}$$

This means that the propagation velocity is determined only by k, which is a physical property value peculiar to the material, and the density $\rho_0$. Therefore, it is possible to provide a look-up table by calculating the propagation velocity with respect to the material in advance. When the propagation velocity is selected in the position locator 523, it is possible to select an appropriate propagation velocity in accordance with the material with reference to the look-up table.

Also, the event extractor 522 may extract the transmission data of the one event by calculating a similarity level between the parameters included in the transmission data. Specifically, the event extractor 522 sets transmission data having a similarity level greater than or equal to a prescribed threshold value as data obtained from elastic waves generated from the same source. For example, the standard Euclidean distance, the Minkowski distance, and the Mahalanobis distance may be used to calculate the similarity level. Hereinafter, a method of calculating a similarity level between parameters and extracting transmission data of one event will be described as a second extraction method.

The position locator 523 identifies a beam in which the elastic waves have been generated on the basis of a sensor ID and waveform amplitude information included in each of a plurality of pieces of transmission data of one event extracted by the event extractor 522, sensor position information, and an elastic wave propagation model.

The sensor position information includes information about an installation position of the sensor 10 in association with the sensor ID. The sensor position information may be, for example, position information on an elastic wave propagation model of the bogie 1 serving as an inspection target or information such as distances from a specific position of the bogie 1 in horizontal and vertical directions.

The storage 53 stores the transmission data, the elastic wave propagation model, and the sensor position information acquired by the acquirer 521. The storage 53 is configured using a storage device such as a magnetic hard disk device or a semiconductor storage device.

The display 54 displays information in accordance with control of the controller 52. For example, the display 54 displays an identification result of the position locator 523. The display 54 is an image display device such as a liquid crystal display or an organic electro luminescence (EL) display. The display 54 may be an interface for connecting the image display device to the inspection apparatus 50. In this case, the display 54 generates a video signal for displaying the identification result and outputs the video signal to the image display device connected to the display 54.

Figure 6:
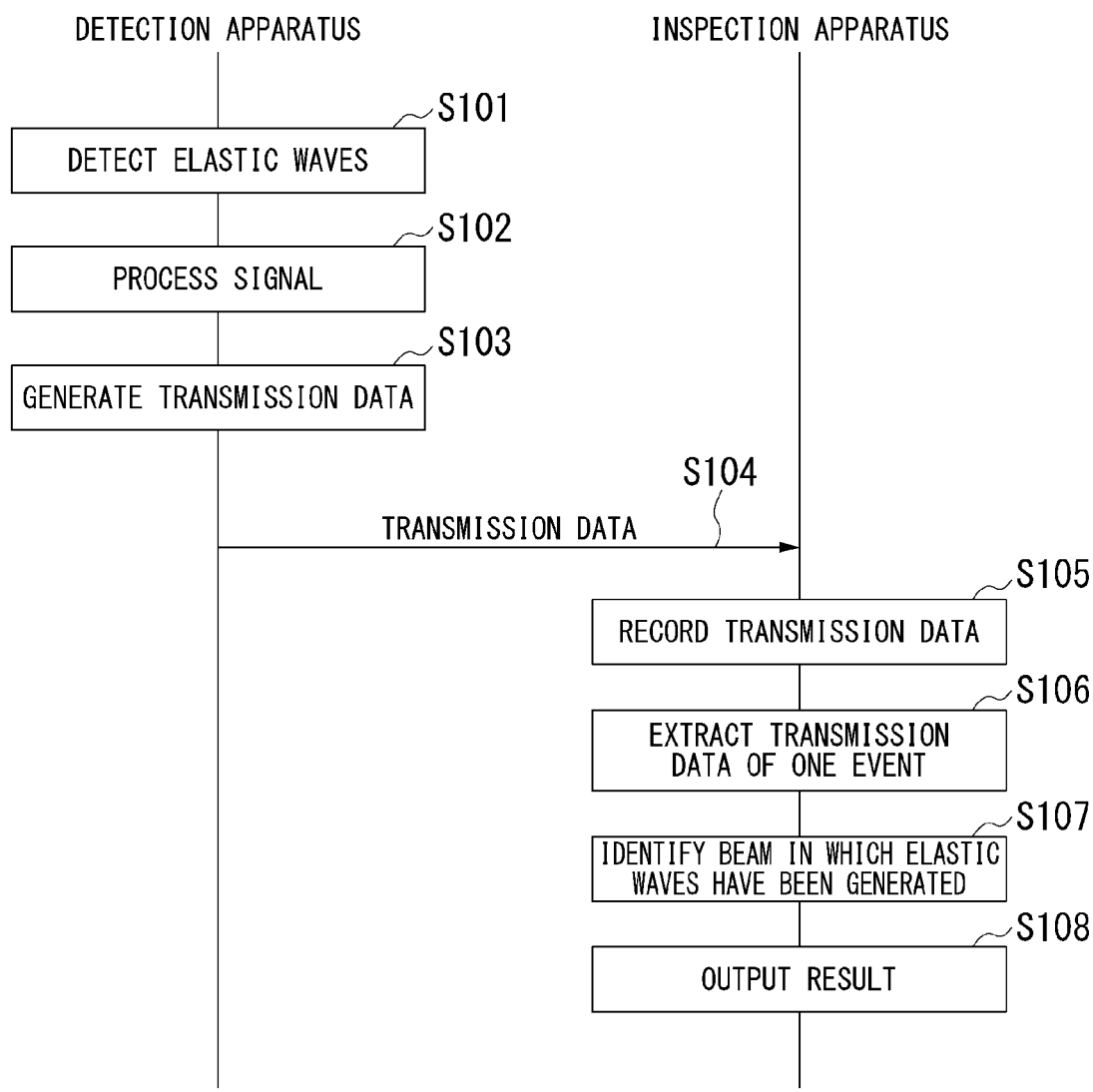
FIG. 6 is a sequence diagram showing a flow of a process of the inspection system according to the first embodiment.

FIG. 6 is a sequence diagram showing a flow of a process of the inspection system 100 according to the first embodiment.

Each sensor 10 detects elastic waves (step S101). Each sensor 10 converts detected elastic wave into an electrical signal and outputs the electrical signal to the signal processor 20. The signal processor 20 performs signal processing on each electrical signal output from each sensor 10 (step S102). Specifically, the signal processor 20 performs signal processing such as noise removal, arrival time determination, and parameter extraction with respect to each electrical signal. The signal processor 20 executes the above-described signal processing every time an electrical signal is obtained from the sensor 10.

The signal processor 20 generates transmission data for each sensor 10 using data after the signal processing (step S103). The signal processor 20 outputs the generated transmission data for each of the sensors 10 to the wireless communicator 30. Here, the signal processor 20 may output the transmission data to the wireless communicator 30 every time the transmission data is generated or may collectively output transmission data to the wireless communicator 30 at a timing when the transmission data has been generated for a certain period. The wireless communicator 30 wirelessly transmits the transmission data output from the signal processor 20 to the inspection apparatus 50 (step S104).

The wireless communicator 51 of the inspection apparatus 50 receives the transmission data transmitted from the wireless communicator 30. The acquirer 521 acquires the transmission data received by the wireless communicator 51. The acquirer 521 records the acquired transmission data in the storage 53 (step S105). The event extractor 522 extracts a plurality of pieces of transmission data of one event stored in the storage 53 (step S106). For example, the event extractor 522 extracts the transmission data of the one event in either the first extraction method or the second extraction method. The event extractor 522 outputs the extracted transmission data of the one event to the position locator 523.

The position locator 523 identifies a beam in which the elastic waves have been generated on the basis of the sensor ID and the waveform amplitude information included in each piece of the transmission data of the one event and the sensor position information and the elastic wave propagation model stored in the storage 53 (step S107). A method of identifying a beam in which elastic waves have been generated will be described using FIG. 3. Also, it is assumed that the sensors 10 are disposed as shown in FIG. 3. As an example, it is assumed that the side beam 2-1 is damaged and elastic waves are generated in the side beam 2-1.

In the case of the above assumption, the sensor 10-1 installed on the side beam 2-1 can detect elastic waves with substantially no influence of attenuation. On the other hand, the sensor 10-3 installed on the cross beam 3 detects the elastic waves via the welded portion 4-1. Thus, the sensor 10-3 detects attenuated elastic waves whose amplitude is lower about 20 dB than the amplitude in the elastic wave source. Also, the sensor 10-2 installed on the side beam 2-2 detects further attenuated elastic waves whose amplitude is lower 20 dB than the amplitude of the elastic waves detected by the sensor 10-3 (a total of 40 dB than the amplitude in the elastic wave source). In this case, the amplitude of the elastic waves detected by the sensor 10-1 installed on the side beam 2-1 is highest. Generally, the elastic waves are weak. Thus, the elastic waves attenuated by 40 dB is likely to be lowered to a noise level or less and elastic wave detection becomes difficult. In this way, a peculiar phenomenon occurs in the bogie 1.

The position locator 523 identifies a beam in which a sensor 10, which has detected elastic waves having the highest amplitude, is installed as a beam in which elastic waves have been generated on the basis of information about the amplitude of the elastic waves detected by each sensor 10 (for example, the sensors 10-1 to 10-3). More specifically, the position locator 523 first determines the sensor 10 that has detected the elastic waves having the highest amplitude using the amplitude information. Next, the position locator 523 identifies an arrangement position of the sensor 10 that has detected the elastic waves having the highest amplitude using the sensor ID associated with the amplitude information and the sensor position information. Because the position locator 523 can ascertain at which position (for example, on which beam) each sensor 10 is disposed on the bogie 1 through the elastic wave propagation model, it is possible to identify the beam in which the elastic waves have been generated on the basis of the arrangement position of the sensor 10 that has detected the elastic waves having the highest amplitude.

Also, even if the side beam 2-2 or the cross beam 3 is damaged, it is possible to perform identification by performing a similar process. For example, it is assumed that the cross beam 3 is damaged and elastic waves are generated in the cross beam 3. In this case, the sensor 10-3 installed on the cross beam 3 can detect the elastic waves with substantially no influence of attenuation. On the other hand, each of the sensor 10-1 installed on the side beam 2-1 and the sensor 10-2 installed on the side beam 2-2 detect elastic waves via the welded portion 4-1 or 4-2. Thus, the sensors 10-1 and 10-2 detect elastic waves whose amplitude is lower about 20 dB than the amplitude in the elastic wave source. In this case, the amplitude of the elastic waves detected by the sensor 10-3 installed on the cross beam 3 becomes highest.

The position locator 523 identifies a beam in which a sensor 10, which has detected elastic waves having the highest amplitude, is installed as a beam in which elastic waves have been generated on the basis of information of the amplitude of the elastic waves detected by each sensor 10. Also, the elastic waves generated in the cross beam 3 include elastic waves generated in the cross beam 3 itself and elastic waves generated in the welded portion of the electric motor or the like welded to the cross beam 3.

The above process is a process based on the transmission data of one event. When each beam is damaged or when there are a plurality of damaged portions on the same beam, it is possible to identify a beam in which the elastic waves have been generated by iteratively executing the processing of steps S106 and S107.

The position locator 523 outputs an identification result (step S108). For example, the position locator 523 causes the display 54 to display information about the beam in which the elastic waves have been generated.

Conventionally, a non-destructive inspection method such as ultrasonic testing (UT) has been applied to the soundness evaluation on the bogie frame. For example, in the UT, the presence or absence of a defect is ascertained by transmitting ultrasonic waves inside the side beam using an ultrasonic probe and receiving ultrasonic waves reflected and returned from the defect. However, because the inspection is carried out while the ultrasonic probe is being moved point by point after the entire inspection site is subjected to base treatment, a time period longer than or equal to half a day is required for inspecting the entire bogie frame. Although it is possible to shorten an inspection time period using a plurality of ultrasonic probes, the number thereof is enormous, ranging from tens to hundreds. Moreover, because there are a plurality of bogies on one railway vehicle, a significant increase in cost is inevitable.

Regarding monitoring during an operation, a method of installing an acceleration sensor on a bogie frame or an axle box and detecting an abnormality from a change in natural vibrations is known (for example, Patent Document 1 and Patent Document 2). However, a state in which the natural vibrations change is a state in which the rigidity is already affected, such as a large crack growing, and damage at the initial stage cannot be detected.

On the other hand, the inspection system 100 according to the first embodiment includes at least one or more sensors 10 installed on each of the plurality of side beams 2-1 and 2-2 and the cross beam 3 and configured to detect elastic waves; and the position locator 523 configured to identify a beam in which the elastic waves have been generated on the basis of a feature value of the elastic waves detected by the sensors 10 installed on each of the side beams 2-1 and 2-2 and the cross beam 3. As described above, in the inspection system 100 according to the first embodiment, a sensor for detecting elastic waves is provided on each of the plurality of side beams 2-1 and 2 and the cross beam 3 so that damage is detected at an initial stage. The inspection system 100 identifies a beam in which the elastic waves have been generated on the basis of a feature value of the elastic waves detected by each sensor 10. Thereby, it is possible to identify in which beam the elastic waves have been generated. Thus, it is possible to identify an abnormality in the bogie easily before damage becomes extensive.

Furthermore, the inspection system 100 includes the one or more sensors 10, the signal processor 20 configured to extract a feature value of elastic waves detected by the one or more sensors 10, the wireless communicator 30 configured to wirelessly transmit transmission data including data of the feature value of the elastic waves, and the power supply 40 configured to supply electric power to the signal processor 20 and the wireless communicator 30, wherein the sensor 10, the signal processor 20, the wireless communicator 30, and the power supply 40 are mounted on the bogie. Thereby, the detection apparatus can operate with the electric power supplied from the power supply 40. Furthermore, it is possible to reduce the work cost of cable laying and management by forming a wireless structure.

Modified Example of Inspection System 100 According to First Embodiment

In the above-described embodiment, a configuration in which at least one or more sensors 10 are installed on each of the plurality of side beams 2-1 and 2-2 and the cross beam 3 has been described. The sensor 10 may be configured to be installed on at least one of the plurality of side beams 2-1 and 2-2 or the cross beam 3.

Second Embodiment

Although it is possible to identify a beam in which elastic waves have been generated in the first embodiment, it is difficult to identify a position where the elastic waves have been generated. In a second embodiment, a configuration for identifying a position where elastic waves have been generated will be described. Also, in the second embodiment, a configuration in which a position of an elastic wave source on a side beam is identified will be described.

Figure 7:
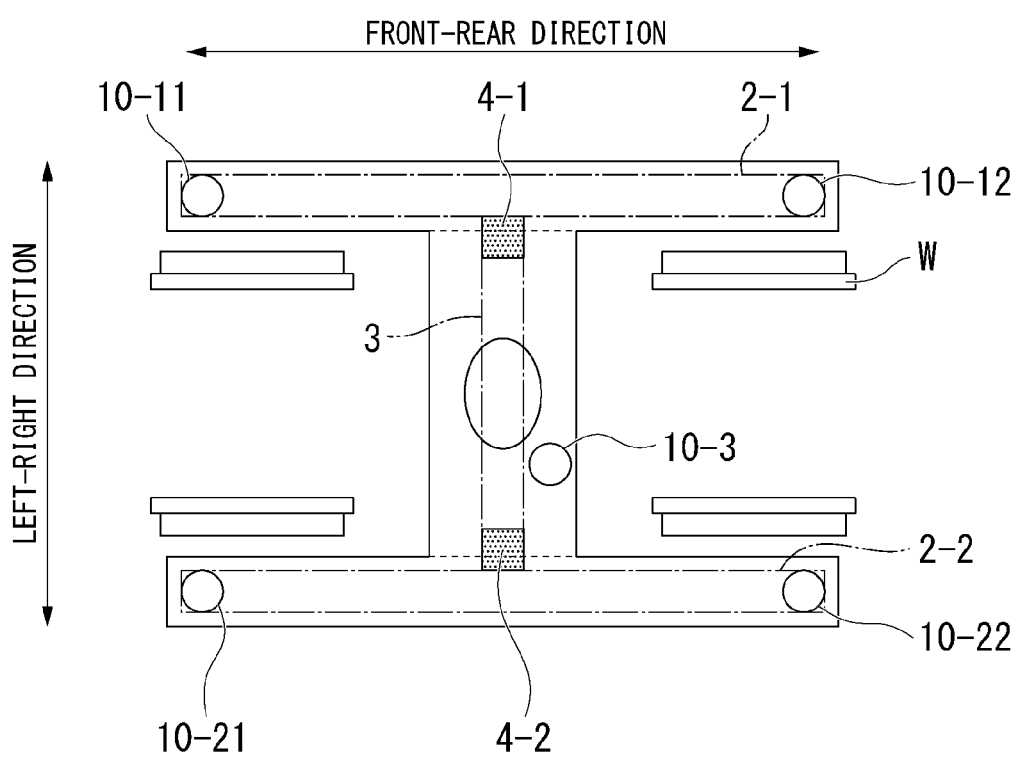
FIG. 7 is a diagram showing an example of an arrangement of sensors according to the second embodiment.

FIG. 7 is a diagram showing an example of an arrangement of sensors 10 according to the second embodiment.

As shown in FIG. 7, in the second embodiment, the sensors 10 are installed near both ends of side beams 2-1 and 2-2 and on a cross beam 3. It is assumed that the sensors 10 installed near both the ends of the side beam 2-1 are sensors 10-11 and 10-12, the sensors 10 installed near both the ends of the side beam 2-2 are sensors 10-21, 10-22, and the sensor 10 installed above the cross beam 3 is a sensor 10-3. Also, an installation position of the sensor 10-3 is not limited to a location shown in FIG. 7, and may be any position as long as it is on the beam on which the sensor 10-3 is installed.

Figure 8:
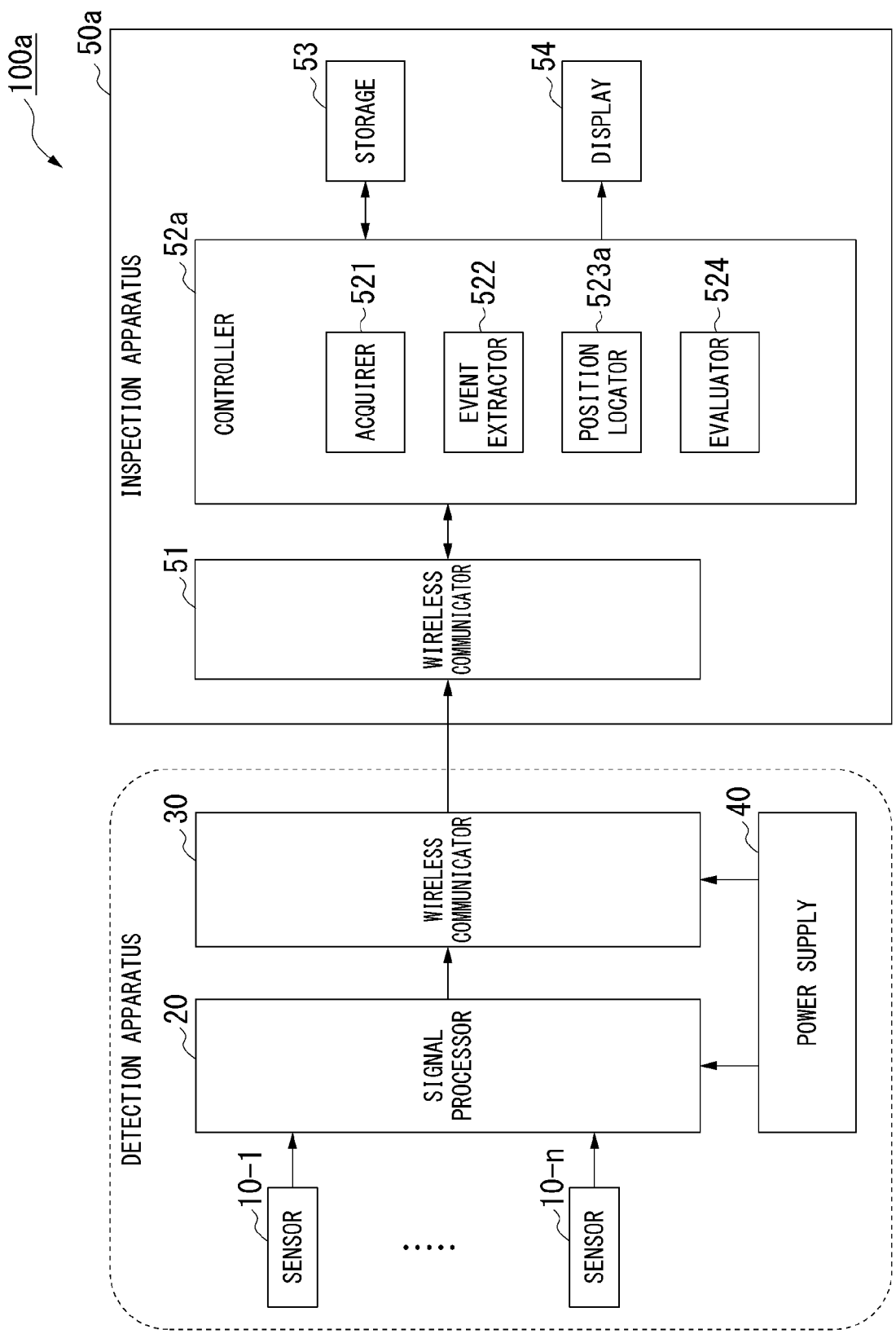
FIG. 8 is a diagram showing a configuration of an inspection system according to the second embodiment.

FIG. 8 is a diagram showing a configuration of an inspection system 100a according to the second embodiment. The inspection system 100a includes a plurality of sensors 10-1 to 10-n, a signal processor 20, a wireless communicator 30, a power supply 40, and an inspection apparatus 50a. A configuration other than the inspection apparatus 50a is similar to that of the first embodiment.

The inspection apparatus 50a includes a wireless communicator 51, a controller 52a, a storage 53, and a display 54. The controller 52a controls the entire inspection apparatus 50a. The controller 52a is configured using a processor such as a CPU or a memory. The controller 52a functions as an acquirer 521, an event extractor 522, a position locator 523a, and an evaluator 524 by executing the program.

Some or all of functional units of the acquirer 521, the event extractor 522, the position locator 523a, and the evaluator 524 may be implemented by hardware such as an ASIC, a PLD, or an FPGA or may be implemented by software and hardware in cooperation. The program may be recorded on a computer-readable recording medium. The computer-readable recording medium is, for example, a non-transitory storage medium which is a flexible disk, a magneto-optical disk, a ROM, a portable medium such as a CD-ROM, a storage device such as a hard disk embedded in a computer system, or the like. The program may be transmitted via a telecommunication circuit.

Some of the functions of the acquirer 521, the event extractor 522, the position locator 523a, and the evaluator 524 do not need to be installed in the inspection apparatus 50a in advance and may be implemented by installing an additional application program in the inspection apparatus 50a.

The configuration of the controller 52a is different from that of the controller 52 in that the position locator 523a is provided instead of the position locator 523 and the evaluator 524 is newly provided. The above differences will be described below.

The position locator 523a locates a position of an elastic wave source on the basis of a sensor ID, time information, waveform amplitude information, sensor position information, and an elastic wave propagation model included in each of a plurality of pieces of transmission data of one event extracted by the event extractor 522. The position locator 523a according to the second embodiment locates the position of the elastic wave source that has been generated in the side beam 2. For example, the position locator 523a according to the second embodiment locates the position of the elastic wave source in one dimension.

As shown in FIG. 7, when the sensors 10-11 and 10-12 are installed near both ends of the side beam 2-1 one by one, it is possible to identify a damaged position in the side beam 2-1 by performing a one-dimensional position locating process on the basis of an arrival time difference between the sensors 10-11 and 10-12. Furthermore, when the sensors 10-21 and 10-22 are installed near both ends of the side beam 2-2 one by one, it is possible to identify a damaged position in the side beam 2-2 by performing a one-dimensional position locating process on the basis of an arrival time difference between the sensors 10-21 and 10-22.

However, due to the structure of the bogie 1, elastic waves that have been generated in the cross beam 3 other than the elastic waves that have been generated in the side beam 2 may be detected by the sensor 10 installed on the side beam 2 via a welded portion 4-1 or 4-2. When the position locator 523a locates the position using the elastic waves that have been generated in the cross beam 3, an erroneous locating result may be obtained. Thus, in the second embodiment, it is necessary to exclude the elastic waves that have been generated in the cross beam 3 as noise.

Amplitude information and time information can be used as criteria for determining elastic waves that have been generated in the cross beam 3. The elastic waves, which have been generated in the cross beam 3, are detected by the sensor 10-11, 10-12, 10-21, or 10-22 installed on the side beam 2 via the welded portion 4-1 or 4-2. Thus, in the case of the elastic waves that have been generated in the cross beam 3, the amplitude of the elastic waves detected by the sensor 10-11, 10-12, 10-21, or 10-22 installed on the side beams 2 becomes lower than the amplitude of the elastic waves detected by the sensor 10-3 installed on the cross beam 3.

Furthermore, the elastic waves, which have been generated in the cross beam 3, reach the sensor 10-3 installed on the cross beam 3 before reaching the sensor 10-11, 10-12, 10-21, or 10-22 installed on the side beam 2. Thus, in the case of the elastic waves that have been generated in the cross beam 3, the arrival time of the elastic waves detected by the sensor 10-11, 10-12, 10-21, or 10-22 installed on the side beam 2 becomes later than the arrival time of the elastic waves detected by the sensor 10-3 installed on the cross beam 3.

Based on the above conditions, the position locator 523a excludes transmission data satisfying the following exclusion condition(s) as noise from transmission data of one event. Exclusion described here means that the transmission data is not used for locating a position. Also, the position locator 523a may exclude transmission data satisfying one of the following exclusion conditions (1) and (2) as noise or exclude transmission data satisfying both the conditions as noise. That is, the position locator 523a may identify the elastic waves that have propagated from the cross beam 3 on the basis of at least one of a timing when the elastic waves have been detected and an amplitude of the elastic waves.

(Exclusion Conditions in Second Embodiment)

(Side-beam amplitude [dB]+Attenuation value) <Cross-beam amplitude [dB]     (1):

Side-beam arrival time>Cross-beam arrival time     (2):

In the above-described exclusion condition (1), the side-beam amplitude [dB] represents an amplitude [dB] of the elastic waves detected by the sensor 10-11, 10-12, 10-21, or 10-22 installed on the side beam 2 and the cross-beam amplitude [dB] represents an amplitude [dB] of the elastic waves detected by the sensor 10-3 installed on the cross beam 3. The attenuation value is a value representing the attenuation of a signal due to the passage through the welded portion 4-1 or 4-2, and is preferably in a range of, for example, −10 [dB] to −30 [dB].

In the above-described exclusion condition (2), the side-beam arrival time represents an arrival time of elastic waves for the sensor 10-11, 10-12, 10-21, or 10-22 installed on the side beam 2 and the cross-beam arrival time represents an arrival time of elastic waves for the sensor 10-3 installed on the cross beam 3. The above-described exclusion condition (2) means that the side-beam arrival time is later than the cross-beam arrival time. In other words, the cross-beam arrival time is earlier than the side-beam arrival time.

(Method of Locating Position)

Here, a method of locating a position in one dimension will be described. When there are two sensors S1 and S2 and a crack occurs between the sensor S1 and the sensor S2, it can be seen that there is a time difference until the elastic waves reach the sensors in accordance with a distance from an elastic wave source to the sensor S1 and a distance from the elastic wave source to the sensor S2. Assuming that the distance between the two sensors S1 and S2 is l and the distance of the elastic wave source from the sensor center is $\Delta x$, an arrival time difference $\Delta t$ is expressed by the following Eq. (3).

$$\Delta t = \left(\left(\frac{l}{2}+\Delta x\right)-\left(\frac{l}{2}-\Delta x\right)\right)/v = 2\Delta x/v \quad (3)$$

Consequently, if $\Delta x$ can be obtained by observing $\Delta t$ and the distance l between the sensors S1 and S2 is known, the position of the elastic wave source can be located.

A similar concept can also be applied in the case of two dimensions. It is assumed that there are four sensors S1 to S4. When a crack has occurred in SRC1, the elastic waves propagate concentrically around SRC1 at a velocity V. Elastic waves reach the sensors S1 to S4 with a time difference. If the position of the sensor and the propagation velocity are known, the time difference is determined depending upon only the position of the elastic wave source. On the other hand, when the time difference is detected, the elastic wave source is located on circumferences ARC_S1 to ARC_S4 centered on the sensors S1 to S4. If there are a plurality of sensors S1 to S4, it can be determined that a position where circles intersect is an estimated source.

In three dimensions, a similar position locating process can also be performed using at least (Number of dimensions+1) sensors.

The position locator 523a may regard elastic waves determined to be generated outside a prescribed observation range as noise as a result of locating a position and remove the elastic waves. Although it is determined whether a signal is noise or a meaningful signal based on a prescribed threshold value in noise removal as described above, a threshold value condition can be flexibly changed by performing noise processing at the inspection apparatus 50a side. That is, many conditions such as an installation situation, a condition of a measurement target, and a climatic condition can be taken into consideration to enable a flexible determination to be made and the noise can be removed more effectively.

The evaluator 524 evaluates a deteriorated state of at least one of the side beams 2 and the cross beam 3 on the basis of a one-dimensional position locating result in the position locator 523a. The evaluator 524 according to the second embodiment evaluates the deteriorated state of the side beam 2 on the basis of the one-dimensional position locating result in the position locator 523a. Specifically, the evaluator 524 evaluates that there is damage to a region of the side beam 2 in which a spatial density of the elastic wave source is greater than or equal to a prescribed threshold value on the basis of the one-dimensional position locating result.

Figure 9:
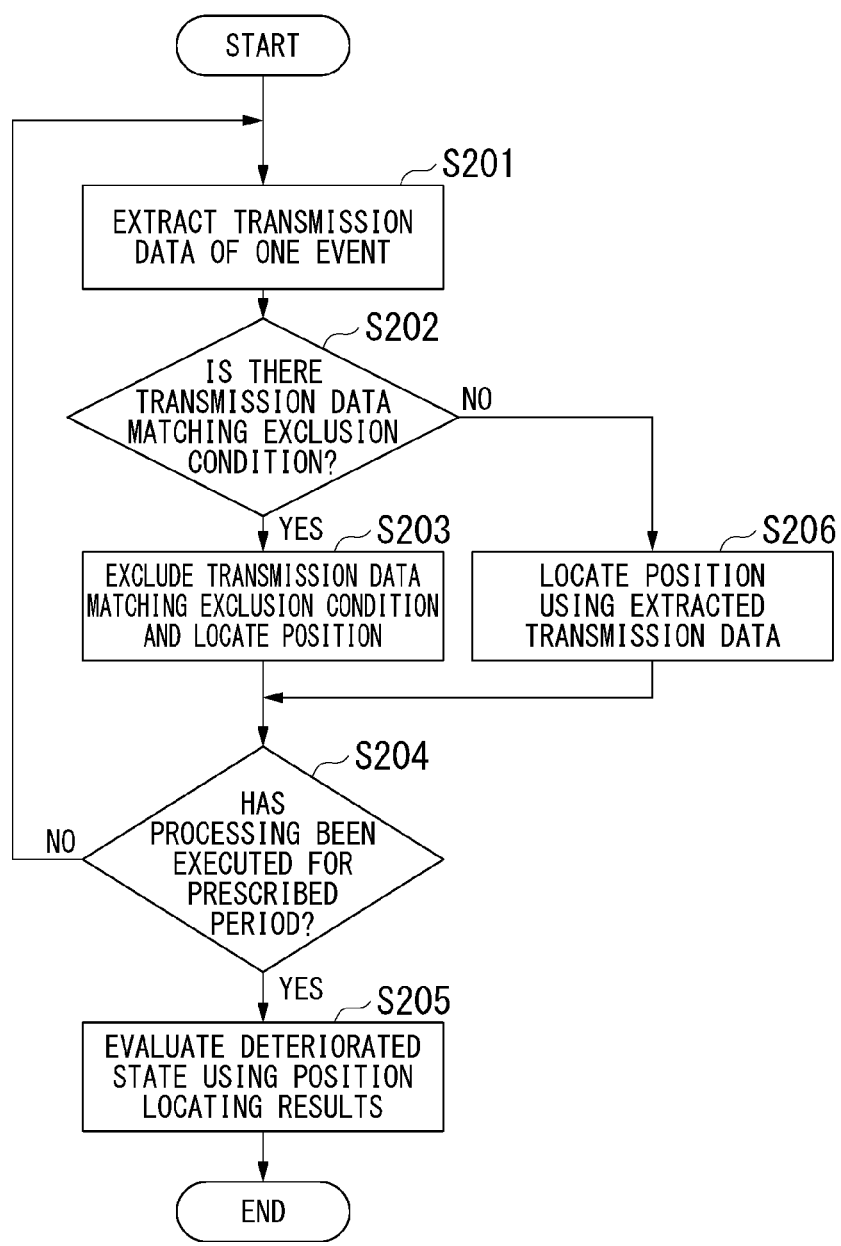
FIG. 9 is a flowchart showing a flow of a process performed by an inspection apparatus according to the second embodiment.

FIG. 9 is a flowchart showing a flow of a process performed by the inspection apparatus 50a according to the second embodiment. Also, in the second embodiment, the following process is executed after the processing of steps S101 to S105 according to the first embodiment is executed.

The position locator 523a extracts a plurality of pieces of transmission data of one event stored in the storage 53 (step S201). The position locator 523a determines whether or not there is transmission data matching an exclusion condition from the plurality of pieces of transmission data that have been extracted (step S202). When there is transmission data matching the exclusion condition (step S202—YES), the position locator 523a excludes the transmission data matching the exclusion condition.

The position locator 523a performs a position locating process on the side beam 2 on the basis of a plurality of pieces of transmitted data that are not excluded, the sensor position information, and the elastic wave propagation model (step S203). For example, it is assumed that the position locator 523a performs a position locating process on the side beam 2-1. In this case, the position locator 523a may not use transmission data of elastic waves detected by the sensors 10-21 and 10-22 installed on the side beam 2-2.

Thereby, the position of the elastic wave source generated in the side beam 2-1 is located in the position locating process performed by the position locator 523a. The position locator 523a outputs a position locating result to the evaluator 524. The position locator 523a determines whether or not the processing of steps S201 to S203 have been performed for a prescribed period (step S204). When the processing of steps S201 to S203 has not been performed for the prescribed period (step S204-NO), the inspection apparatus 50a iteratively executes the processing from step S201.

When the inspection apparatus 50a has performed the processing of steps S201 to S203 for a prescribed period (step S204—YES), the evaluator 524 evaluates a deteriorated state of the side beam 2-1 using position locating results for the prescribed period (step S205). Specifically, the evaluator 524 evaluates that there is damage to a region of the side beam 2-1 where a spatial density of the elastic wave source is greater than or equal to a prescribed threshold value on the basis of a one-dimensional position locating result.

In the processing of step S202, when there is no transmission data matching the exclusion condition (step S202-NO), the position locator 523a locates a position on the side beam 2 on the basis of all the transmission data extracted by the event extractor 522, the sensor position information, and the elastic wave propagation model (step S206).

Figure 10:
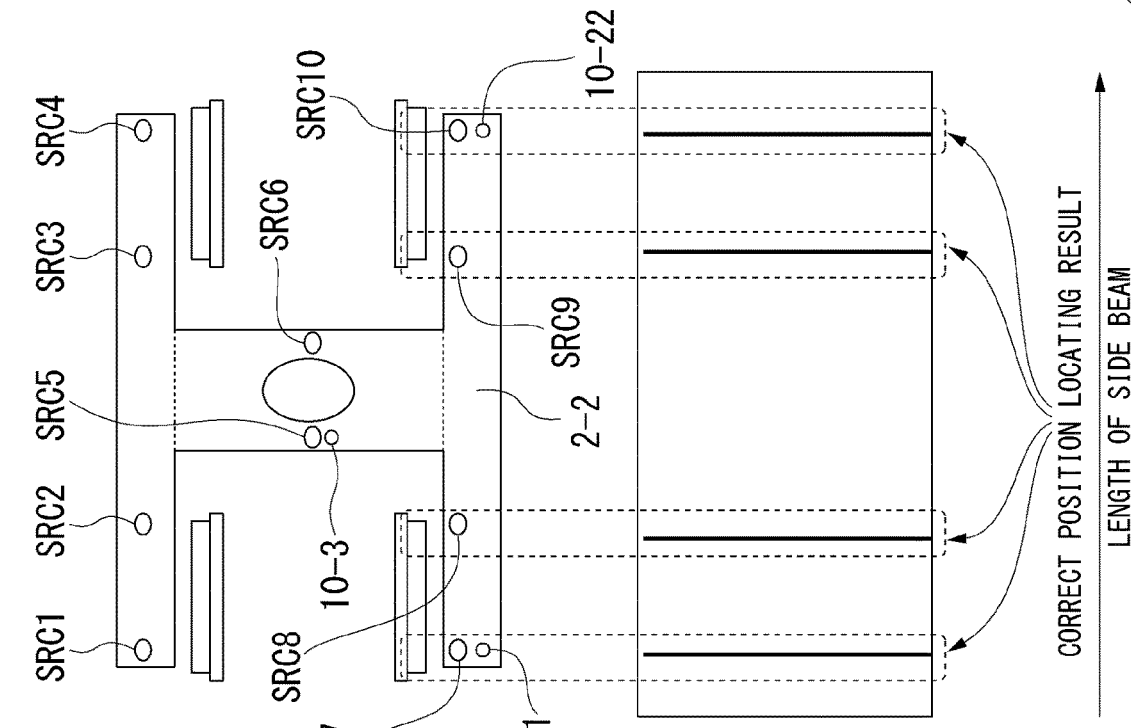
FIG. 10 is a diagram showing an experimental result of locating a position using a conventional method and an experimental result of locating a position using a method according to the second embodiment.
Figure 10:
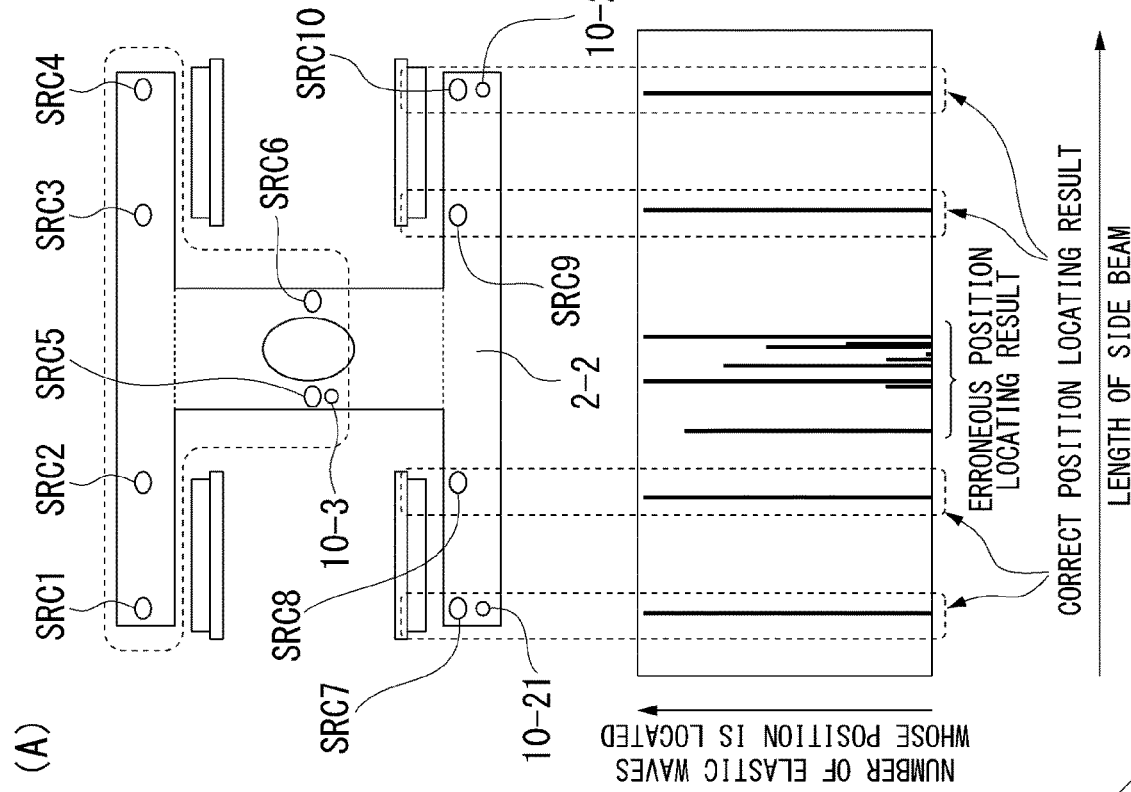

FIG. 10 is a diagram showing results of an experiment of locating a position using a conventional method and results of an experiment of locating a position using a method according to the second embodiment. In the experiment, pseudo elastic waves obtained by simulating elastic waves caused by cracks were generated at 10 different positions on the bogie 1. Locations where the pseudo elastic waves were generated are denoted by SRC1 to SRC10. Here, a position locating result using the conventional method is a position locating result using all detected elastic waves without performing a process of the exclusion condition. In FIG. 10, FIG. 10(A) shows a position locating result using the conventional method and FIG. 10(B) shows a position locating result using the method according to the second embodiment.

In the conventional method, elastic waves, which have been generated in the side beam 2-1 at a position opposite that of the side beam 2-2 and the cross beam 3, are incoming in addition to the elastic waves that have been generated in the side beam 2-2, and an elastic wave source is located at a position which is not an original crack location on the side beam 2-2 (see an erroneous position locating result in FIG. 10(A)). On the other hand, when the method according to the second embodiment is used, only the source of the elastic waves that have been generated in the side beam 2-2 is located and the influence of the elastic waves that have been generated in the other beams can be excluded.

Also, transmission data not matching the exclusion condition indicates that the elastic waves have been generated from a beam other than the side beam 2-2. Thus, the position locator 523a can also identify that transmission data not matching the exclusion condition is transmission data of elastic waves that have been generated in the side beam 2-1 or the cross beam 3. Therefore, the position locator 523a may notify that the elastic waves are generating in another beam in addition to the output of the position locating result. Thereby, other beams can be inspected at an early stage.

According to the inspection system 100a configured as described above, the sensors 10 are installed near both ends of each of the first side beam 2-1 and the second side beam 2-2 and the position locator 523a locates a position of an elastic wave source that has been generated in the side beam on the basis of a time difference between the elastic waves detected by the sensors 10 installed at both the ends. Thus, the position of the elastic wave source that has been generated in the side beam can be easily identified.

As described above, the elastic waves that have propagated from the cross beam 3 reach the sensor 10 installed on the side beam 2 via the welded portion 4. The elastic waves via the welded portion 4 are attenuated by about 20 dB and reach the sensor 10 installed on the side beam 2. Further, the elastic waves that have been generated in the cross beam reach the sensor 10 installed on the cross beam before reaching the sensor 10 installed on the side beam 2. Therefore, the position locator 523a identifies the elastic waves that have propagated from the cross beam 3 on the basis of at least one of a timing when the elastic waves have been detected by each of the sensors 10 installed near both the ends and an amplitude of the elastic waves and locates an elastic wave source that has been generated in the side beam 2 on the basis of elastic waves other than the identified elastic waves that have propagated from the cross beam 3. As described above, in the second embodiment, the sensor 10-3 installed on the cross beam 3 is used as a guard sensor. Thereby, it is possible to perform filtering so that the elastic waves that have early reached the sensor 10-3 installed on the cross beam 3 or the elastic waves with a large amplitude detected by the sensor 10-3 installed on the cross beam 3 are not used to locate a position on the side beam 2. As a result, deterioration of the position locating accuracy due to the use of elastic waves that have propagated from the cross beam 3 can be limited.

The inspection system 100a further includes the evaluator 524 configured to evaluate a deteriorated state of at least one of the plurality of side beams 2-1 and 2-1 and the cross beam 3 on the basis of a position of an elastic wave source located by the position locator 523. Thereby, it is possible to evaluate whether or not there is damage to the side beam 2-1 or 2-1 or the cross beam 3.

Modified Example of Inspection System 100a According to Second Embodiment

In the example shown in FIG. 7, a configuration in which the sensors 10 are installed near both ends of each of the side beams 2-1 and 2-2 is shown. When the side beam 2 serving as a target on which a position locating process is performed is determined, the sensors 10 may be installed near both ends of either the side beam 2-1 or the side beam 2-2 serving as a target on which a position locating process is performed.

Third Embodiment

In a third embodiment, a configuration in which a position of an elastic wave source on a cross beam is identified will be described. The configuration of the third embodiment is basically similar to that of the second embodiment. Differences from the second embodiment are an arrangement of sensors 10 and content of exclusion conditions. Hereinafter, the differences from the second embodiment will be described.

Figure 11:
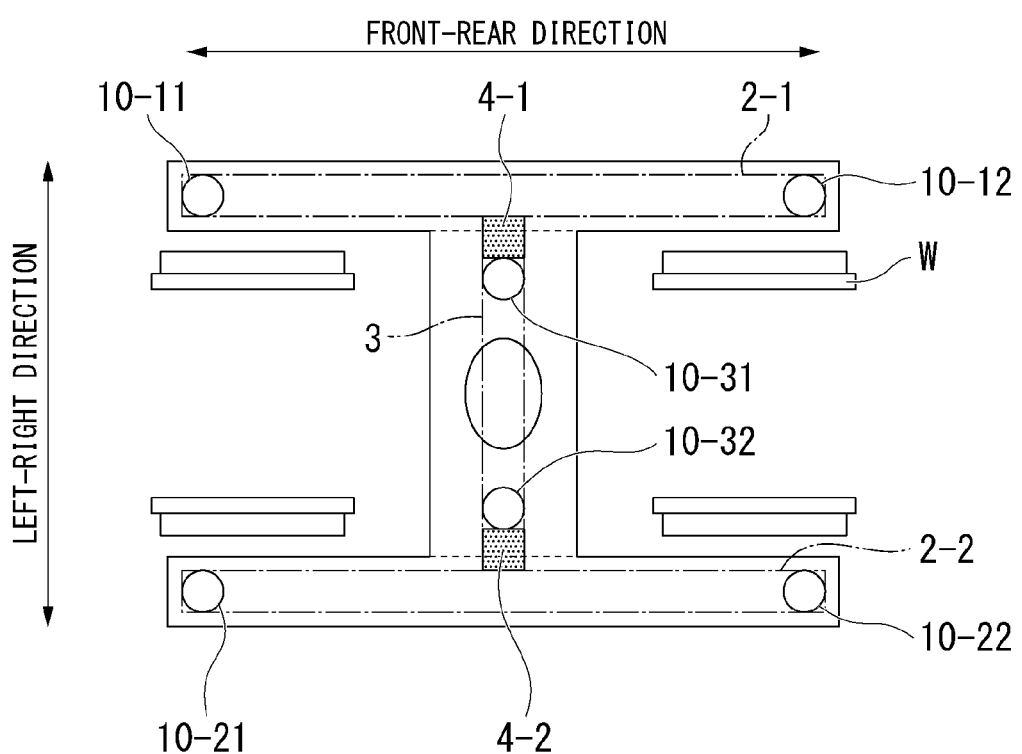
FIG. 11 is a diagram showing an example of an arrangement of sensors according to a third embodiment.

FIG. 11 is a diagram showing an example of an arrangement of sensors 10 according to the third embodiment.

As shown in FIG. 11, in the third embodiment, it is assumed that the sensors 10 are installed near both ends of the side beams 2-1 and 2-2 and near both ends of the cross beam 3. It is assumed that the sensors 10 installed near both the ends of the side beam 2-1 are sensors 10-11 and 10-12, the sensors 10 installed near both the ends of the side beam 2-2 are sensors 10-21 and 10-22, and the sensors 10 installed near both the ends of the cross beam 3 are sensors 10-31 and 10-32.

As shown in FIG. 11, when the sensors 10-31 and 10-32 are installed near both the ends of the cross beam 3 one by one, it is possible to identify a damaged position in the cross beam 3 by performing a one-dimensional position locating process on the basis of an arrival time difference for the sensors 10-31 and 10-32. However, due to the structure of the bogie 1, the elastic waves that have been generated in the side beam 2 other than the elastic waves that have been generated in the cross beam 3 may be detected by the sensor 10-31 or 10-32 installed on the cross beam 3 via a welded portion 4-1 or 4-2. When a position locator 523a locates a position using the elastic waves that have been generated in the side beam 2, an erroneous position locating result may be obtained. Thus, in the third embodiment, it is necessary to exclude the elastic waves that have been generated in the side beam 2 as noise.

As in the second embodiment, amplitude information and time information can be used as criteria for determining elastic waves that have been generated in the side beam 2. The elastic waves, which have been generated in the side beam 2, are detected by the sensor 10-31 or 10-32 installed on the cross beam 3 via the welded portion 4-1 or 4-2. Thus, in the case of the elastic waves that have been generated in the side beam 2, the amplitude of the elastic waves detected by the sensor 10-31 or 10-32 installed on the cross beam 3 becomes lower than the amplitude of the elastic waves detected by the sensor 10-11, 10-12, 10-21, or 10-22 installed on the side beams 2.

Furthermore, the elastic waves, which have been generated in the side beam 2, reach the sensor 10-11, 10-12, 10-21, or 10-22 installed on the side beam 2 before reaching the sensor 10-31 or 10-32 installed on the cross beam 3. Thus, in the case of the elastic waves that have been generated in the side beam 2, the arrival time of the elastic waves detected by the sensor 10-31 or 10-32 installed on the cross beam 3 becomes later than the arrival time of the elastic waves detected by the sensor 10-11, 10-12, 10-21, or 10-22 installed on the side beam 2.

Based on the above-described conditions, the position locator 523a excludes transmission data satisfying the following exclusion conditions as noise from the transmission data of one event. The exclusion conditions in the third embodiment are as follows.

Exclusion Conditions in Third Embodiment (Cross-beam amplitude [dB]+Attenuation value)
    <Side-beam amplitude [dB]        (1):

Cross-beam arrival time>Side-beam arrival time        (2):

In the process according to the third embodiment, with respect to the flowchart of FIG. 9, it is only necessary to use the exclusion conditions in the third embodiment as exclusion conditions, replace the side beam 2 with the cross beam 3, and replace the cross beam 3 with the side beam 2.

According to an inspection system 100b configured as described above, the sensors 10 are installed near both ends of the cross beam 3 and the position locator 523a locates a position of an elastic wave source that has been generated in the cross beam 3 on the basis of a time difference of elastic waves detected by the sensors 10 installed near both the ends of the cross beam 3. Thus, the position of the elastic wave source that has been generated in the cross beam 3 can be easily identified.

As described above, elastic waves that have propagated from the side beam 2 reach the sensor 10 installed on the cross beam 3 via a welded portion 4. The elastic waves via the welded portion 4 are attenuated by about 20 dB and reach the sensor 10 installed on the cross beam 3. Furthermore, the elastic waves generated in the side beam 2 reach the sensor 10 installed on the side beam 2 before reaching the sensor 10 installed on the cross beam 3. Therefore, the position locator 523a identifies the elastic waves that have propagated from the side beam 2 on the basis of a timing when the elastic waves have been detected by each of the sensors 10 installed near both the ends of the cross beam 3 and the amplitude of the elastic waves and locates a position of an elastic wave source generated in the cross beam 3 on the basis of elastic waves from which the identified elastic waves, which have propagated from the side beam 2, are excluded. As described above, in the third embodiment, the sensor 10 installed on the side beam 2 is used as a guard sensor. Thereby, it is possible to perform filtering so that elastic waves that early reach the sensor 10 installed on the side beam 2 or elastic waves with a large amplitude detected by the sensor 10 installed on the side beam 2 are not used for a position locating process on the cross beam 3. As a result, deterioration of the position positioning accuracy due to the use of elastic waves that have propagated from the side beam 2 can be limited.

Modified Example of Inspection System 100a in Third Embodiment

Although sensors 10 are also installed at both ends of each of the side beams 2-1 and 2-2 in FIG. 11, it is only necessary to install at least one sensor 10 on each of the side beams 2-1 and 2-2.

Other Modified Examples

The first to third embodiments may be combined with other embodiments. For example, the second embodiment and the third embodiment may be combined, so that a configuration in which both a position locating process on the side beam and a position locating process on the cross beam are performed may be adopted. For example, the first to third embodiments are combined, so that a configuration in which a beam in which the elastic waves have been generated is identified and the method of the second embodiment or the method of the third embodiment is applied in accordance with the beam in which the elastic waves have been generated may be adopted. Hereinafter, a detailed description will be given.

First, a configuration in which the second embodiment and the third embodiment are combined will be described. In this case, as shown in FIG. 11, it is assumed that the sensors 10 are installed near both ends of the side beams 2-1 and 2-2 and near both ends of the cross beam 3. The inspection apparatus 50a first locates a position of an elastic wave source on the side beam 2 using the method shown in the second embodiment. That is, the inspection apparatus 50a locates the position of the elastic wave source on the side beam 2 by executing the process shown in FIG. 9. At this time, the inspection apparatus 50a may locate a position of an elastic wave source on either the side beam 2-1 or the side beam 2-2 or may locate positions of elastic wave sources on both the side beam 2-1 and the side beam 2-2. When the position of the elastic wave source is located on both the side beam 2-1 and the side beam 2-2, for example, it is only necessary to locate the position of the elastic wave source on the side beam 2-2 after the position of the elastic wave source on the side beam 2-1 is located. The position of the elastic wave source on the side beam 2 may be first located on either one of the side beams 2-1 and 2-2. Subsequently, the inspection apparatus 50a locates the position of the elastic wave source on the cross beam 3 using the method shown in the third embodiment.

In the configuration in which the second embodiment and the third embodiment are combined, the inspection apparatus 50a may locate the position of the elastic wave source on the side beam 2 using the method shown in the second embodiment after locating the position of the elastic wave source on the cross beam 3 using the method shown in the third embodiment.

Next, a configuration in which the first to third embodiments are combined will be described. In this case, it is assumed that the sensors 10 are installed at positions obtained by combining FIGS. 3 and 11. Also, when some of the sensors 10 installed near both ends of the side beams 2-1 and 2-2 and near both ends of the cross beam 3 (for example, the sensor 10-11, the sensor 10-21, and the sensor 10-31) are used as sensors to identify a beam in which elastic waves have been generated, the sensors 10 may be installed as shown in FIG. 11. The inspection apparatus 50a first identifies the beam in which the elastic waves have been generated using the method shown in the first embodiment.

Next, the inspection apparatus 50a locates a position of an elastic wave source on the identified beam using the method shown in the second embodiment or the third embodiment. For example, when the identified beam is the side beam 2, the inspection apparatus 50a locates the position of the elastic wave source using the method shown in the second embodiment. For example, when the identified beam is the cross beam 3, the inspection apparatus 50a locates the position of the elastic wave source using the method shown in the third embodiment.

In combination with other embodiments as described above, it is possible to execute a plurality of processes in one process. Specifically, it is possible to execute a plurality of processes such as a process of locating a position of elastic waves that have been generated in each of the side beam 2 and the cross beam 3 and a process of locating a position of an elastic wave source by identifying a beam in which elastic waves have been generated. Thereby, it is possible to identify an abnormality in a bogie easily and efficiently before damage becomes extensive.

Although the bogie of the railway vehicle has been described as an example in each of the above embodiments, the above method does not have to be limited to the bogie of the railway vehicle. For example, the bogie may be a bogie that carries cargo other than vehicles.

The above-described side beams and cross beam are defined only by a relative positional relationship regardless of their names and functions and may have other functions. For example, the side beams may be portions of other names having a function such as a shaft spring if they are a pair of structures extending in a front-rear direction of the bogie and disposed apart from each other in a left-right direction of the bogie. Typical crack generation locations in the bogie are a lower portion of the side beam to which the load is applied, a connector associated with an electric motor welded to the cross beam, and the like.

According to at least one embodiment described above, there are provided one or more sensors installed on at least one of a plurality of side beams and a cross beam and configured to detect elastic waves; and a position locator configured to identify a beam in which the elastic waves have been generated or locate a source position of the elastic waves on the basis of the elastic waves detected by the one or more sensors. Thereby, it is possible to identify an abnormality in a bogie easily before damage becomes extensive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection system for inspecting a bogie comprising a plurality of side beams extending in a front-rear direction and disposed apart from each other in a left-right direction and a cross beam connecting the plurality of side beams, the inspection system comprising:
   one or more sensors installed on at least one of the plurality of side beams or the cross beam and configured to detect elastic waves; and a position locator configured to identify a beam in which the elastic waves have been generated or locate a position of an elastic wave source on the basis of the elastic waves detected by the one or more sensors.

2. The inspection system according to claim 1,
wherein at least one of the one or more sensors is installed on each of the plurality of side beams and the cross beam, and
wherein the position locator identifies a beam in which the elastic waves occur on the basis of a feature value of the elastic waves detected by the sensors installed on each of the plurality of side beams and the cross beam.

3. The inspection system according to claim 1,
wherein the plurality of side beams are a first side beam and a second side beam,
wherein the one or more sensors are installed at least near both ends of one of the first side beam and the second side beam, and
wherein the position locator locates the position of the elastic wave source that have been generated in the side beam on the basis of a time difference of the elastic waves detected by the sensors installed near both the ends of the one of the first side beam and the second side beam.

4. The inspection system according to claim 3, wherein the position locator identifies the elastic waves that have propagated from the cross beam on the basis of at least one of a timing when the elastic waves have been detected by each of the sensors installed near both the ends and an amplitude of the elastic waves and locates the position of the elastic wave source that have been generated in the side beam on the basis of elastic waves other than the identified elastic waves propagated from the cross beam.

5. The inspection system according to claim 1,
wherein the one or more sensors are installed near both ends of the cross beam, and
wherein the position locator locates a position of an elastic wave source that have been generated in the cross beam on the basis of a time difference of the elastic waves detected by the sensors installed near both the ends of the cross beam.

6. The inspection system according to claim 5, wherein the position locator identifies the elastic waves that have propagated from the cross beam on the basis of at least one of a time when the elastic waves have been detected by each of the sensors installed near both the ends and an amplitude of the elastic waves and locates a position of an elastic wave source that have been generated in the side beam on the basis of elastic waves other than the identified elastic waves that have propagated from the cross beam.

7. The inspection system according to claim 5, wherein a connector of the cross beam and the plurality of side beams is near both the ends of the cross beam.

8. The inspection system according to claim 1, further comprising an evaluator configured to evaluate a deteriorated state of at least one of the plurality of side beams and the cross beam on the basis of the elastic wave source located by the position locator.

9. The inspection system according to claim 1, further comprising:
a signal processor configured to extract a feature value of the elastic waves detected by the one or more sensors;
a wireless transmitter configured to transmit data of the feature value of the elastic waves extracted by the signal processor; and
a power supply configured to supply electric power to the signal processor and the wireless transmitter,
wherein the signal processor, the wireless transmitter, and the power supply are installed on the bogie.

10. The inspection system according to claim 9, wherein the power supply is a vibration power generator installed at a prescribed position on the bogie.

11. The inspection system according to claim 10, wherein a natural frequency of the vibration power generator is near a primary bending natural frequency of the bogie.

12. The inspection system according to claim 10,
wherein the bogie is a bogie of a railway vehicle, and
wherein the prescribed position where the vibration power generator is installed is near an air spring that supports the railway vehicle or near a position directly above an axle box.

13. An inspection apparatus for inspecting a bogie comprising a plurality of side beams extending in a front-rear direction and disposed apart from each other in a left-right direction and a cross beam connecting the plurality of side beams, the inspection apparatus comprising:
a position locator configured to identify a beam in which elastic waves have been generated or locate a position of an elastic wave source on the basis of the elastic waves detected by one or more sensors installed on at least one of the plurality of side beams and the cross beam and configured to detect the elastic waves.

14. An inspection method to be performed by an inspection apparatus for inspecting a bogie comprising a plurality of side beams extending in a front-rear direction and disposed apart from each other in a left-right direction and a cross beam connecting the plurality of side beams, the inspection method comprising:
identifying a beam in which elastic waves have been generated or locating a position of an elastic wave source on the basis of the elastic waves detected by one or more sensors installed on at least one of the plurality of side beams and the cross beam and configured to detect the elastic waves.

* * * * *